United States Patent Office 3,392,184
Patented July 9, 1968

3,392,184
ALLOPHANATES AND THIOLALLOPHANATES
Henri Ulrich, North Branford, and Adnan A. R. Sayish, North Haven, Conn., assignors to The Upjohn Company, Kalamazoo, Mich., a corporation of Delaware
No Drawing. Filed Aug. 5, 1965, Ser. No. 477,576
4 Claims. (Cl. 260—455)

ABSTRACT OF THE DISCLOSURE

Hydrocarbyl 2,4-disubstituted allophanates and thiolallophanates, wherein the 2-substituent is alkyl and the 4-substituent is alkyl or aryl, are prepared by reacting the appropriate 2,4-disubstituted allophanoyl chloride with the appropriate hydrocarbyl alcohol or thiol. The 2,4-disubstituted allophanates and thiolallophanates are sources of isocyanates into which they dissociate on heating at 150° C. to 275° C. Said allophanates and thiolallophanates are also useful as acetal resin stabilizers, and as insecticides and miticides.

---

This invention relates to a novel process for the preparation of hydrocarbyl allophanates and thiolallophanates and is more particularly concerned with the preparation of hydrocarbyl allophanates and thiolallophanates having an alkyl substituent in the 2-position and having an alkyl or aryl substituent in the 4-position and with the allophanates and thiolallophanates thereby produced, and with the use of these compounds as intermediates in the preparation of isocyanates.

The novel process of the invention, in its broadest aspect, comprises a process for the preparation of esters selected from the class consisting of hydrocarbyl allophanates and thiolallophanates having alkyl as substituent in the 2-position and having a substituent selected from the group consisting of alkyl and aryl in the 4-position, which process comprises reacting the correspondingly 2,4-substituted allophanoyl chloride with a compound selected from the class consisting of hydrocarbyl alcohols and hydrocarbyl thiols and the alkali metal derivatives of said alcohols and thiols.

The term "hydrocarbyl" as employed throughout this specification and claims means the monovalent radical obtained by removing one hydrogen atom from a parent hydrocarbon preferably one containing from 1 to 18 carbon atoms, inclusive. Illustrative of hydrocarbyl are alkyl groups such as methyl, ethyl, propyl, butyl, pentyl, hexyl, octyl, decyl, dodecyl, hexadecyl, octadecyl, and the like, including isomeric forms thereof; alkenyl groups such as vinyl, allyl, butenyl, pentenyl, hexenyl, octenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like, including isomeric forms thereof; cycloalkenyl such as cyclopentenyl, cyclohexenyl, cycloheptenyl, and the like, including isomeric forms thereof.

The hydrocarbyl moiety in the esters produced according to the process of the invention can be substituted, in addition to substituents containing exclusively carbon and hydrogen, by one or more inert substituents i.e. groups which are not reactive with the allophanoyl chloride employed in the process of the invention. Examples of such inert substituents are halo, nitro, alkoxy, alkylmercapto, and cyano. Illustrative of such substituted hydrocarbyl groups are chloromethyl, trichloromethyl, trifluoromethyl, 2-chloroethyl, 2,3-dichlorobutyl, 5-bromooctyl, 6,7-dibromodecyl, methoxymethyl, 2-ethoxypropyl, 3-ethoxyhexyl, 2-cyanoethyl, 3-cyanopropyl, 2-methylmercaptopropyl, 4-chlorophenyl, 3-fluorophenyl, 4-cyanophenyl, 3-methoxyphenyl, 4-ethoxyphenyl, 2-chloronaphthyl, 2-methylmercaptophenyl, 3,4-dimethoxyphenyl, 3-chlorobenzyl, 4-fluorobenzyl, 2-methoxycyclopentyl, 3-bromocyclohexyl, 4-chlorocyclohexenyl, 2-chloropropenyl, 4-bromobutenyl, 2-chlorovinyl, nitromethyl, 3-nitrobutyl, 4-nitrophenyl, 2-nitronaphthyl, 3-methyl-4-nitrophenyl, 3-nitrocyclopentyl, 2-nitro-1-butenyl, 4-methylmercaptobenzyl, 2-chlorobenzhydryl, 2,4-dibromobenzhydryl, and the like.

The term "alkoxy" as used through the specification and claims means alkoxy containing from 1 to 8 carbon atoms, inclusive, such as methoxy, ethoxy, propoxy, butoxy, pentyloxy, hexyloxy, heptyloxy, octyloxy, and isomeric froms thereof. The term "alkylmercapto" as used throughout the specification and claims means alkylmercapto containing from 1 to 8 carbon atoms, inclusive, such as methylmercapto, ethylmercapto, propylmercapto, butylmercapto, pentylmercapto, hexylmercapto, hetpylmercapto, octylmercapto, and isomeric forms thereof.

The alkyl substituents which are present in the 2-position and optionally in the 4-position of the allophanates and thiolallophanates produced by the process of the invention are advantageously those defined under "hydrocarbyl" above and preferably are those containing from 1 to 8 carbon atoms, inclusive. The aryl substituents which are present optionally as substituents in the 4-position of the allophanates and thiolallophanates produced by the process of the invention are advantageously those defined and illustrated under "hydrocarbyl" above and preferably are those containing from 6 to 12 carbon atoms, inclusive.

The numbering of the atoms within the skeleton of the allophanates and thiolallophanates, as employed throughout the specification and claims, follows the system adopted by Chemical Abstracts and is illustrated below by reference to the formula of the simplest 2,4-dialkylallophanate namely, methyl 2,4-dimethylallophanate:

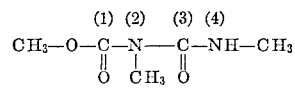

While the preparation of allophanates generally is known in the art, no method of broad applicability to the preparation of allophanates having alkyl in the 2-position and alkyl or aryl in the 4-position has been proposed hitherto. Slotta et al., Berichte, 60, 295, 1927 prepared methyl 2,4-dimethylallophanate by cleaving 3,5-dimethyl-2,4,6-trioxo-1.3,5-oxadiazine using potassium hydroxide in methanol. This, however, is clearly not a method of general applicability to the preparation of other alkyl substituted allophanates and, as far as the production of the methyl ester itself is concerned, suffers the additional disadvantage that it requires the use of an expensive and not readily available starting material.

Kogon, J. Am. Chem. Soc., 78, 4911, 1956; J. Org. Chem. 23, 1594, 1958; ibid., 26, 3004, 1961, has described the preparation of a series of alkyl 2,4-diarylallophanates by reaction of an alkyl carbanilate with an aryl isocyanate. This author reported however (J. Org. Chem. 26, 3004, 1961) that the use of an alkyl isocyanate in place of the aryl isocyanate did not yield the expected 2,4-dialkylallophanate.

Accordingly the present invention provides for the first time a process of general applicability to the preparation of allophanates and thiolallophanates having the stated substituents in the 2- and 4-positions. In addition the present invention makes available for the first time a broad class of compounds the majority of which are novel and which possess valuable properties as will be discussed more fully hereinafter.

The process of the invention can be represented schematically as follows:

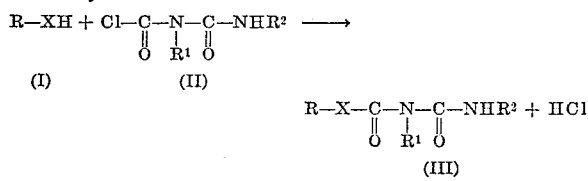

wherein R represents hydrocarbyl as above defined, $R^1$ represents alkyl, $R^2$ is selected from the class consisting of alkyl and aryl and X is selected from the class consisting of —O— and —S—.

While the above equation has been shown, for purposes of simplicity, as employing a monohydric alcohol or thiol (I) said monohydric alcohol or thiol can be replaced by a polyhydric alcohol and thiol and each of the alcohol or thiol groups in the latter will, generally speaking, undergo esterification in accordance with the above reaction. The process of the invention is not limited to the use of monohydric alcohols and thiols but extends to the use of polyhydric alcohols or thiols. In describing the manner of carrying out the process of the invention reference will be made to the use of monohydric alcohols and thiols but it will be understood that this is done for purposes of convenience only and that polyhydric alcohols and thiols can be employed in place of the monohydric compounds.

In carrying out the process of the invention the thiol or alcohol (I) and the appropriate allophanoyl chloride (II) are brought together in the presence of an inert organic solvent. The term "inert organic solvent" means any organic solvent which is inert under the conditions of the reaction i.e. does not enter into reaction with either of the reactants. Examples of such solvents are benzene, toluene, xylene, chlorobenzene, dichlorobenzene, ether, tetrahydrofuran, petroleum ether, kerosene, hexanes, octanes, and the like.

Advantageously the thiol or alcohol (I) and the appropriate allophanoyl chloride (II) are employed in approximately stoichiometric proportions but an excess of either reactant can be employed if desired. The order of mixing the reactants is not critical to success of the invention.

The thiol or alcohol (I) can be employed in the process of the invention either in the form of the free alcohol or thiol, as shown in the equation above, or in the form of an alkali metal salt, such as the sodium, potassium or lithium salt, in which case the corresponding alkali metal chloride, rather than hydrogen chloride, is the by-product of the reaction. When the free alcohol or thiol (I), rather than the alkali metal salt, is used it has been found advantageous to include in the reaction mixture a base which can act as acceptor of the hydrogen chloride produced in the reaction. Said base is preferably a tertiary amine for example pyridine, quinoline, isoquinoline, an N - alkylpiperidine such as N - methylpiperidine, N - ethylpiperidine, and the like, a trialkylamine such as trimethylamine, triethylamine, tripropylamine and the like, and an N,N - dialkylaniline such as N,N - dimethylaniline, and the like.

Advantageously said base is present in the reaction mixture in an amount equivalent to the amount of hydrogen chloride to be generated in the reaction i.e. at least about 1 equivalent of base per mole of allophanoyl chloride (II) should be present in the reaction mixture. If desired, an excess of base over the stoichiometric proportion can be employed but offers no advantage in terms of yield of product.

When the thiol or alcohol (I) is employed in the process of the invention in the form of an alkali metal salt, the corresponding alkali metal chloride is formed (in place of the hydrogen chloride shown in the reaction equation above) and generally separates from the reaction mixture as a precipitate. If desired the thiol or alcohol (I) can be converted to its alkali metal salt as a preliminary step in the process of the invention, using conventional procedures; for example by treatment of the alcohol or thiol (I) with the stoichiometric amount of the alkali metal or the hydride thereof or by treating the alcohol or thiol (I) with the stoichiometric amount of alkali metal hydroxide and removing the water formed in the reaction by azeotropic distillation. Using such procedures the alkali metal salt of the thiol or alcohol (I) can be prepared in situ in the reaction vessel and the allophanoyl chloride (II) and inert organic solvent can be added thereto in a subsequent step.

In whatever form the alcohol or thiol (I) is employed in the process of the invention the reaction between the alcohol or thiol (I) and the allophanoyl chloride can be carried out at temperatures varying over a wide range. Advantageously a reaction temperature within the range of about 0° C. to about 110° C. is satisfactorily although higher temperatures can be employed if desired provided the reaction temperature is maintained below that at which one or both reactants will decompose without entering substantially into the desired reaction. In many cases the reaction proceeds at a convenient rate at temperatures of the order of about 25° C.

The progress of the reaction can be followed in the case in which the free alcohol or thiol (I) is used in the presence of a base by determining the amount of base hydrochloride which has been formed, and, in the case in which the alcohol or thiol (I) is employed in the form of an alkali metal salt, by determining the amount of alkali metal chloride eliminated.

The desired ester (II) can be isolated by conventional procedures from the reaction mixture obtained in the process of the invention. For example, the precipitate formed in the reaction i.e. the base hydrochloride or the alkali metal chloride, is first separated by filtration, centrifugation, and the like, and the filtrate is evaporated to dryness to remove the inert organic solvent. The residue, the desired ester (II), is then purified, if necessary, by conventional procedures such as chromatography, countercurrent distribution, recrystallization in the case of solids, distillation in the case of liquids, or any combination of these.

The hydrocarbyl 2,4 - disubstituted allophanates and 2,4 - disubstituted thiolallophanates prepared by the process of the invention are useful for a variety of purposes. For example, they form excellent sources of "instant" isocyanates since upon heating to a temperature within the range of about 150° C. to about 275° C. they decompose with the formation of a mixture of isocyanate and the starting alcohol or thiol (I). This decomposition is illustrated by the following equation:

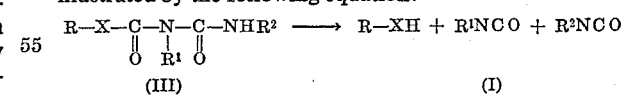

wherein R, $R^1$, $R^2$, and X have the significance hereinbefore defined. Where $R^1$ and $R^2$ represent different radicals a mixture of two isocyanates will be formed whereas, in the case wherein $R^1$ and $R^2$ are identical, a single isocyanate will be formed. By appropriate choice of the radicals R, $R^1$, and $R^2$ in the compound (III) it is possible to generate a mixture of the isocyanate and the thiol or alcohol (I) the components of which differ sufficiently in volatility to enable the isocyanate to be separated readily from the mixture by distillation.

Accordingly, by virtue of the above facile decomposition of the hydrocarbyl 2,4-disubstituted allophanates of the invention it is possible to employ the latter compounds as ready sources of isocyanate. Thus, many of the isocyanates currently in demand for synthesis of, for example, polyurethanes, antidiabetic sulfonylureas, and as curing agents for rubber and the like, are subject to instability on storage and have to be protected from light and moisture in order to avoid degradation, polymerization and the like reactions. In addition many of the lower aliphatic isocyanates are sufficiently volatile to pose a problem of toxicity in respect of personnel charged with the handling and transport of these materials. The hydrocarbyl 2,4-disubstituted allophanates and thiolallophanates of the invention present an answer to this problem in that they enable isocyanates to be stored in a chemically combined form which is easy to handle and free from toxicity problems and problems of instability to light and atmospheric moisture. Said isocyanates can be stored in this combined form indefinitely and yet can be regenerated at any desired time by simple heat decomposition.

While all the hydrocarbyl 2,4-disubstituted allophanates and thiolallophanates are suitable as a means of storing and generating isocyanates those wherein each of the 2- and 4-substituents are alkyl [i.e. $R^1$ and $R^2$ in (III) each represent alkyl, and the hydrocarbyl radical R in (III) is aryl] are particularly suitable for this purpose since not only is this particular group of compounds a ready source of aliphatic isocyanates, which normally pose a difficult storage problem, but the alcohol or thiol (1) in which R is aryl (which is also produced in the decomposition of the allophanates and thiolallophanates, is generally much less volatile than the isocyanate and these components of the decomposition product can therefore be separated readily.

In addition to their usefulness as sources of "instant" isocyanates the hydrocarbyl 2,4-disubstituted allophanates and thiolallophanates produced by the process of the invention can be used as stabilizers of acetal resins. For this purpose, they can be used in the place of the closely related hydrocarbyl carbamates using the procedures described in detail in U.S. Patent 3,144,431. In addition, the hydrocarbyl 2,4-disubstituted allophanates and thiolallophanates of the invention are active as insecticides and miticides and for this purpose can be formulated and employed in the control of insects and mites using formulations and procedures well-known in the art for the corresponding closely related hydrocarbyl carbamates; see, for example, U.S. Patent 3,131,215.

The allophanoyl chlorides (II) which are employed as starting materials in the process of the invention can be prepared by reaction of the corresponding 1,3-disubstituted-ureas, $R^1NH$—CO—$NHR^2$ wherein $R^1$ and $R^2$ have the significance above defined with phosgene using the procure described by Ulrich et al., J. Org. Chem., 29, 2401, 1964.

The following examples describe the manner and process of making and using the invention and set forth the best mode contemplated by the inventors of carrying out the invention but are not to be construed as limiting.

EXAMPLE 1

Methyl 2,4-dibutylallophanate

A solution of 0.6 g. (0.01 mole) of sodium methoxide in 10 ml. of methanol was added to 2.34 g. (0.01 mole) of 2,4-dibutylallophanoyl chloride (Ulrich et al. supra) in 10 ml. of methanol. The resulting mixture was allowed to stand for 20 hours at the end of which time the mixture was filtered and the filtrate was evaporated to dryness. The residue was extracted with ether and the ether extract was evaporated to dryness. There was thus obtained 1.8 g. (78% theoretical yield) of methyl 2,3-dibutylallophanate in the form of a liquid having a boiling point of 95 to 97° C. at 0.4 mm. of mercury; $n_D^{23}$ 1.4564.

Using the above procedure but replacing 2,4-dibutylallophanoyl chloride by 2,4-diisopropylallophanoyl chloride (Ulrich et al., supra), 2,4-dimethylallophanoyl chloride (Ulrich et al. supra), 2,4-dioctadecylallophanoyl chloride (Ulrich et al. supra), or 2,4-dicyclohexylallophanoyl chloride (Ulrich et al. supra) there are obtained methyl 2,4-diisopropylallophanate, methyl 2,4-dimethylallophanate, methyl 2,4 - octadecylallophanate, and methyl 2,4-dicyclohexylallophanate, respectively.

EXAMPLE 2

3-t-butylphenyl 2,4-dimethylallophanate

A solution of 15 g. (0.1 mole) of 3-t-butylphenol and 10.1 g. (0.1 mole) of triethylamine in 200 ml. of benzene was stirred while a solution of 15 g. (0.1 mole) of 2,4-dimethylallophanoyl chloride in 50 ml. of benzene was added slowly. The temperature rose to a maximum of 38° C. and stirring was continued until the temperature of the reaction mixture had returned to room temperature (circa 25° C.). The triethylamine hydrochloride (12.7 g.; 94% theoretical yield) which had separated was isolated by filtration and the filtrate was evaporated to dryness. There was thus obtained 26 g. (98.5% theoretical yield) of 3-tert.-butylphenyl 2,4-dimethylallophanate in the form of a solid having a melting point of 70 to 74° C.

EXAMPLE 3 p-Tolyl 2,4-dimethylthiolallophanate

A mixture of 6.1 g. (0.041 mole) of 2,4-dimethylallophanoyl chloride, 5.1 g. (0.041 mole) of p-toluenethiol, 4.14 g. (0.041 mole) of triethylamine and 60 ml. of benzene was stirred until the initial exothermic reaction had subsided and the temperature of the mixture had returned to approximately 25° C. The triethylamine hydrochloride (4.75 g.: 84.3% theoretical yield) which had separated was isolated by filtration and the filtrate was evaporated to dryness. There was thus obtained 10.5 g. of impure p-tolyl 2,4-dimethylthiolallophanate in the form of a solid having a melting point of 70 to 85° C. This material was recrystallized from methanol to give 5.9 g. (60.5% theoretical yield) of p-tolyl 2,4-dimethylthiolallophanate in the form of a crystalline solid having a melting point of 89 to 91° C.

EXAMPLE 4

2,6-di-t-butyl-4-methylphenyl 2,4-dimethylallophanate

Using the procedure described in Example 2, but replacing 3-t-butylphenol by 2,6-di-t-butyl-4-methylphenyl 2,4-dimethylallophanate, there is obtained 2,6-di-t-butyl-4-methylphenyl 2,4-dimethylallophanate.

Similarly using the procedure described in Example 2, but replacing 3-t-butylphenol by 2,6-di-t-butylphenol and 2-t-butyl-4-methylphenol, there are obtained 2,6-di-t-butylphenyl 2,4-dimethylallophanate and 2-t-butyl-4-methylphenyl 2,4-dimethylallophanate, respectively.

EXAMPLE 5

Methyl 2,4-dibutylthiolallophanate

Using the procedure described in Example 1, but replacing sodium methoxide by sodium thiomethylate there is obtained methyl 2,4-dibutylthiolallophanate.

Similarly, using the procedure described in Example 1, but replacing sodium methoxide by the sodium derivatives of ethyl mercaptan, isopropyl mercaptan, octyl mercaptan, dodecyl mercaptan, thiophenol, benzyl mercaptan, p-nitrophenyl mercaptan, cyclohexyl mercaptan, 1-cyclopentenyl mercaptan, 2-naphthyl mercaptan, p-chlorophenyl mercaptan, 2-cyanoethyl mercaptan, 2-ethoxypropyl mercaptan, 3-methoxyphenyl mercaptan, 4-methylmercaptophenyl mercaptan, and 3-chlorobenzyl mercaptan, there are obtained ethyl, isopropyl, octyl, dodecyl, phenyl, benzyl, p-nitrophenyl, cyclohexyl, 1-cyclopentenyl, 2-naphthyl, p-chlorophenyl, 2-cyanoethyl, 2-ethoxypropyl, 3-methoxyphenyl, 4-methylmercaptophenyl, and 3-chlorobenzyl 2,4-dimethylthiolallophanate, respectively.

EXAMPLE 6

*Methyl 2-methyl-4-phenylallophanate*

Using the procedure described in Example 1, but replacing 2,4-dibutylallophanoyl chloride by 2-methyl-4-phenylallophanoyl chloride (prepared from N-methyl-N-phenylurea and phosgene using the procedure described by Ulrich et al. supra) there is obtained methyl 2-methyl-4-phenylallophanate.

Similarly using the procedure described in Example 1, but replacing 2,4-dibutylallophanoyl chloride by 2-methyl-4-p-tolylallophanoyl chloride, 2-methyl-4-p-xylylallophanoyl chloride, 2-methyl - 4 - (2-naphthyl)allophanoyl chloride, 2-ethyl-4-phenylallophanoyl chloride, and 2-isobutyl-4-phenylallophanoyl chloride (all of which allophanoyl chlorides are prepared by reaction of the appropriate N,N'-disubstituted urea with phosgene using the procedure described by (Ulrich et al. supra), there are obtained methyl 2-methyl-4-p-tolylallophanate, methyl-2-methyl-4-p-xylylallophanate, methyl 2-methyl-4-(2-naphthyl)allophanol, methyl 2-ethyl-4-phenylallophanate and methyl 2-isobutyl-4-phenylallophanate, respectively.

EXAMPLE 7

*p-Tolyl 2-methyl-4-phenylthiolallophanate*

Using the procedure described in Example 3, but replacing 2,4-dimethylallophanoyl chloride by 2-methyl-4-phenylallophanoyl chloride there is obtained p-tolyl 2-methyl-4-phenylthiolallophanate.

Similarly, using the procedure described in Example 3, but replacing 2,4-dimethylallophanoyl chloride by 2-methyl-4-p-tolylallophanoyl chloride, 2-methyl-4-p-xylylallophanoyl chloride, 2-ethyl - 4 - phenylallophanoyl chloride, 2-methyl-4-(2-naphthyl)allophanoyl chloride, and 2-isobutyl-4-phenylallophanoyl chloride, there are obtained p-tolyl 2-methyl-4-p-tolyl-thiolallophanate, p-tolyl 2-methyl-4-p-xylylthiolallophanate, p-tolyl 2-ethyl-4-phenylthiolallophanate, p-tolyl 2-methyl - 4 - (2-naphthyl)thiolallophanate, and p-tolyl 2-isobutyl - 4 - phenylthiolallophanate, respectively.

EXAMPLE 8

This example illustrates the use of hydrocarbyl 2,4-disubstituted allophanates of the invention as a source of isocyanate.

A total of 15.6 g. (0.059 mole) of 3-t-butylphenyl 2,4-dimethylallophanate was placed in a distillation flask fitted with distilling head, condenser and receiver, and was heated, using an oil bath, at 279° C. A total of 4.6 g. (68.7% theoretical yield) of methyl isocyanate was collected in the receiver.

Similarly, using the above procedure, 15.2 g. (0.0455 mole) of 2,6-di-t-butyl - 4-methylphenyl 2,4-dimethylallophanate was heated to 277° C. and a total of 4.5 g. (86.5% theoretical yield) of methyl isocyanate was collected.

We claim:
1. Aryl 2,4-dialkylallophanates wherein aryl is from 6 to 12 carbon atoms, inclusive, and alkyl at each of the 2- and 4-positions is from 1 to 8 carbon atoms, inclusive.
2. Aryl 2,4-dialkylthiolallophanates wherein aryl is from 6 to 12 carbon atoms, inclusive and alkyl at each of the 2- and 4-positions is from 1 to 8 carbon atoms, inclusive.
3. 3-t-butylphenyl 2,4-dimethylallophanate.
4. p-Tolyl 2,4-dimethylthiolallophanate.

References Cited

Ulrich et al., "J. Org. Chem." (August 1964), pp. 2401–2404.
Slotta et al., "Ber.," vol. 60, p. 300 (1927).
Pummerer et al., "Ber.," vol. 86, p. 419 (1953).
Blohm et al., "Chem Reviews," vol. 51, p. 474 (1952).
Houben-Weyl, "Met. der Org. Chemie," vol. 9, pp. 754–55 (1955).
Wagner et al., "Syn. Org. Chem." (1953), p. 483.

CHARLES B. PARKER, *Primary Examiner.*

JOSEPH P. BRUST, *Examiner.*

D. R. PHILLIPS, *Assistant Examiner.*